US011224155B2

(12) United States Patent
Ribotta et al.

(10) Patent No.: US 11,224,155 B2
(45) Date of Patent: Jan. 18, 2022

(54) ARTICULATED NOZZLE-HOLDER BOOM ARM FOR AGRICULTURAL SPRAYER

(71) Applicants: Esteban Pablo Ribotta, Rosario (AR); Fernando Gabriel Campagnaro, Pavon Arriba (AR)

(72) Inventors: Esteban Pablo Ribotta, Rosario (AR); Fernando Gabriel Campagnaro, Pavon Arriba (AR)

( * ) Notice: Subject to any disclaimer, the term of this patent is extended or adjusted under 35 U.S.C. 154(b) by 0 days.

(21) Appl. No.: 15/518,263

(22) PCT Filed: Oct. 9, 2015

(86) PCT No.: PCT/EP2015/073380
§ 371 (c)(1),
(2) Date: Apr. 11, 2017

(87) PCT Pub. No.: WO2016/058925
PCT Pub. Date: Apr. 21, 2016

(65) Prior Publication Data
US 2017/0303462 A1    Oct. 26, 2017

(30) Foreign Application Priority Data
Oct. 16, 2014   (AR) ............................. P20140103839

(51) Int. Cl.
*A01B 73/04*    (2006.01)
*A01M 7/00*    (2006.01)
*A01B 73/00*    (2006.01)

(52) U.S. Cl.
CPC ......... *A01B 73/044* (2013.01); *A01M 7/0071* (2013.01); *A01M 7/0075* (2013.01); *A01B 73/00* (2013.01); *A01M 7/00* (2013.01)

(58) Field of Classification Search
CPC ..... A01B 73/04; A01B 73/044; A01B 73/042; A01B 73/048; A01B 73/06; A01B 73/062;
(Continued)

(56) References Cited
U.S. PATENT DOCUMENTS 4,243,105 A * 1/1981 Vogel .................. A01B 73/044
16/223
4,400,994 A * 8/1983 Skjaeveland .......... A01B 73/04
16/223
(Continued)

FOREIGN PATENT DOCUMENTS

DE    102011051088    1/2012
EP          1481586    12/2004

*Primary Examiner* — Alex M Valvis
(74) *Attorney, Agent, or Firm* — Defillo & Associates, Inc.; Evelyn A Defillo

(57) ABSTRACT

An articulated nozzle-holder boom arm for agricultural sprayer which is extensible to the sides of a main chassis and which can be folded to a transportation position by means of an intermediate hinge generally placed in an intermediate point of the boom arm, and the several sections of the beam forming the boom arm can be engaged or disengaged easily and without welding in the hinge or several supports of the beam sections, being the beam sections generally extruded aluminum profiles and the union of the profiles ends obtained engaging the same in retaining flanges included in the supports and hinges of connection of the sections.

3 Claims, 3 Drawing Sheets

(58) Field of Classification Search
CPC ... A01B 73/065; A01B 73/067; A01B 73/046; A01M 7/0071; A01M 7/0075
USPC .................................................. 239/166–168
See application file for complete search history.

(56) References Cited

U.S. PATENT DOCUMENTS

| | | | | |
|---|---|---|---|---|
| 4,467,875 | A * | 8/1984 | Lewison | A01B 73/04 172/502 |
| 4,840,233 | A * | 6/1989 | Friggstad | A01B 51/00 172/311 |
| 6,290,078 | B1 * | 9/2001 | Verchere | B66C 23/26 212/300 |
| 7,364,096 | B1 | 4/2008 | Sosnowski | |
| 7,740,190 | B2 * | 6/2010 | Peterson | A01M 7/0078 16/281 |
| 2016/0037764 | A1 * | 2/2016 | DePriest | A01M 7/0071 248/70 |

* cited by examiner

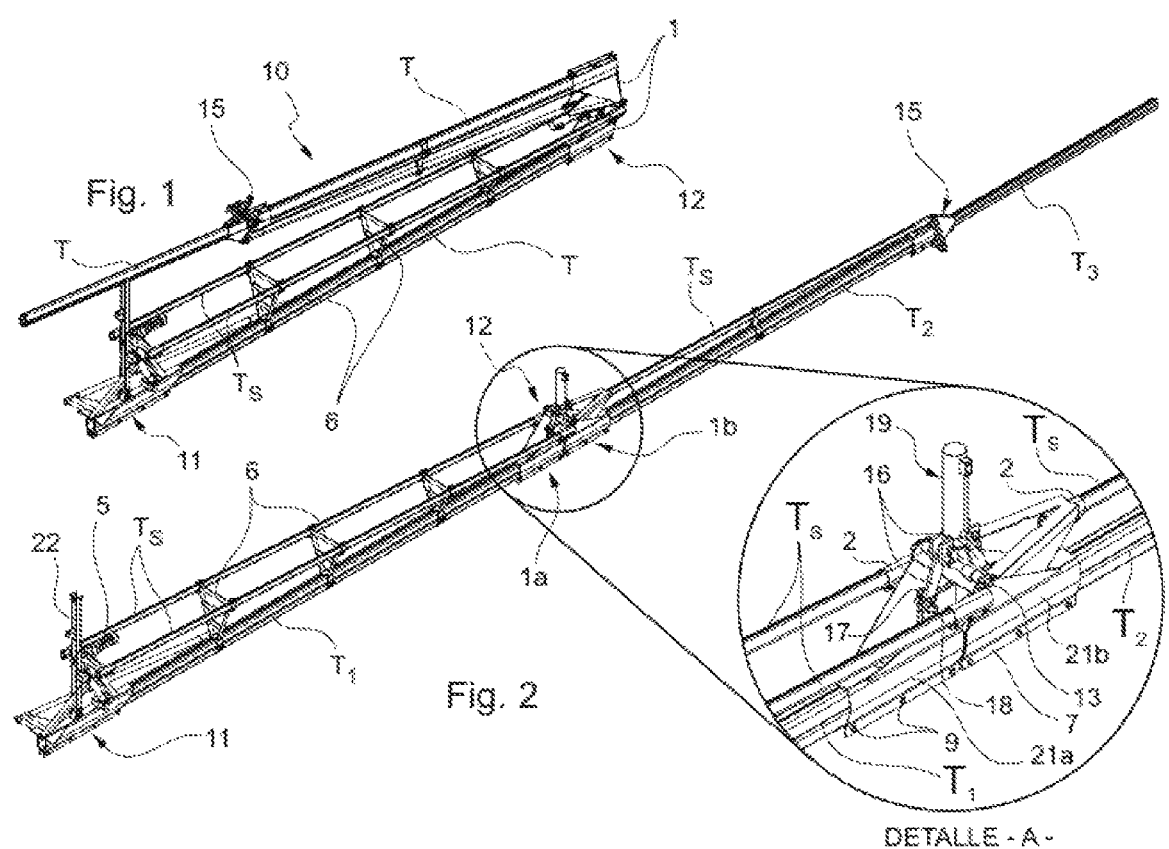

ND NOZZLE-HOLDER BOOM
ARTICULATED NOZZLE-HOLDER BOOM ARM FOR AGRICULTURAL SPRAYER

CROSS REFERENCE TO RELATED APPLICATION

This application is a national stage entry of PCT/EP2015/073380 filed Oct. 9, 2015, under the International Convention claiming priority over Argentina Patent Application No. P20140103839 filed Oct. 16, 2014.

FIELD OF THE INVENTION

This invention is related with the field of the devices intended to be assembled on agricultural machinery or towed by vehicle, particularly, this invention is intended for lateral boom arms or booms of agricultural sprayers or similar, even more specifically, this invention refers to one new type of articulate connection which supports the beam sections which comprise said articulated boom arm.

DESCRIPTION OF THE PRIOR ART

At present, the application of phytosanitary products demand the use of strong and good quality spraying equipment because of the large areas with agricultural developments and to high rates of productivity demanded and with the purpose to obtain the highest efficiency in the application of said phytosanitary products. A spraying equipment for a competitive agricultural development is demanded high robustness and longlasting components since these parts will be subjected to continuous and severe mechanical demands during their operation, and one of the main objectives in agricultural undertakings is to reduce times of maintenance and guarantee the crop productivity.

Said spraying equipment comprises a central frame or chassis over which a spraying liquid deposit is mounted which is connected to a plurality of sprayer nozzles distributed along both extensible boom arms (known as booms) which are located at both places of the chassis. The frame or chassis over which it is supported to both sides said extensible boom arms cantilevered can be independent, that is to say, separated from the motorized vehicle and therefore towable, in such a manner that it is coupled to the tractor vehicle to move over the land to be sprayed. On the other hand, there is also the possibility that the central frame or chassis is completely built in a self-propelled machine. No matter which is the general layout of the boom, only for informational purposes, it is known that most of the spraying sets of equipment have an articulated boom located in the rear part of the sprayer as cantilevered extensible boom arms to the sides.

The demanding conditions of use to which a spraying equipment is subject will determine that the boom has to be strong and light enough to support the operation efforts and keep the application distance of spraying controlled respect the soil along all the extension of the extended boom arm, wherein multiple nozzles are mounted. For this purpose, the "nozzle-holder boom arms" require the use of specially resistant materials and precise engineering structural calculation to reduce fatigue and avoid breaking or soon wearing of the same. It is fundamental the expertise in the boom arm assembly and therefore determine the position and amount of welding points joining the several sections of the extensible boom arm as accurately as possible to avoid material weakening since articulations are welded to the tubular sections part of the boom. Likewise, it is well known that an increase in weight in the beam, that means, when a heavier nozzle holder is added to the sprayer, movement inertia of the swinging produced during operation, is increased and consequently, the set levelness deteriorates and the stress cyclic loads increase.

Added to all the rest, it is well known that once the boom arms are extended, said boom arms are exposed to the risk of collision with obstacles. This risk of collision or stroke is somehow unpredictable and not always avoidable, wherein the obstacles can be just logs, previous structures on the land and/or simple mounds which can collide with some part of the boom arm and produce unexpected swinging, high loss of levelness or even damage to the nozzle-holder boom arm.

At present, the extensible boom arms are manufactured following a structure of consecutive sections strongly welded in intermediate pivoting articulations. It is known that said welded structure, against a collision of one of said sections and/or articulations, suffers a permanent damage in the sprayer machine since the boom arm inevitably damages, whether unpredictably with damage in some articulations and said damages are permanent. Consequently, it is known and accepted in the present state of the art, that in the event of a collision and consequent breaking of the boom, the repair of the damaged boom arm must be done in the workshop, which demands lots of hours and even days of work, labor and money. Complexity of this kind of repairs in welded booms means that cuts and/or unwelding of pieces have to be performed, including replacement of the damaged pieces for new ones and re-welding.

Many times, to avoid boom damage when its ends contact the soil, some skids and springs or even small wheels are added to the ends. Likewise, in the state of the art, most of the equipment sets add a disengagement mechanism (for example an articulation horizontal) in the last section, which gives way when the last section of the boom arm collides with an object. Nevertheless, based on the prior art known, no technical solutions are provided or evidences that allow to infer this invention as it will be described and illustrated in the section with the detailed description.

Many developments of the state of the art have concentrated their efforts to improve the levelness of the booms in relation to the land and to improve the damping conditions of vibrations and stress during the advance of the agricultural spraying machine, keeping greater rigidity and length of the boom, but with no new technical solutions to the maintenance problem, easiness of assembly, modification of the configuration and repair of the same booms.

Therefore, according to the above stated related to the present state of the art, the inventors of this invention were motivated to obtain a new structure of boom capable to offer an articulated boom arm for agricultural sprayer with easy assembly and repair, even in extreme breaking conditions, and being able besides to obtain additional advantages such as a possible prediction and/or conditioning of the breaking areas and easy change of the configuration and/or length of the nozzle-holder boom arm itself.

SUMMARY OF THE INVENTION

One of the purposes of this invention is to provide an articulated nozzle-holder boom arm for agricultural spraying, without being limited to said kind of application, which enables an easy assembly of the beam sections with the subsequent supports and articulations along the boom arm, using for this purpose the avoidance of any kind of welding and permanent connections between said beam sections and the consecutive supports and articulations, this also possible for tensing beams or upper rods of any kind.

It is also the purpose of this invention to provide an articulated nozzle-holder boom arm for agricultural sprayer which is extensible to the sides of a main chassis and which can be folded to a transportation position by means of an intermediate hinge placed in an intermediate point of the boom arm, and the several sections of the beam forming the boom arm can be engaged or disengaged easily and without welding in the hinge or several supports of the beam sections, being the beam sections extruded aluminum profiles and the union of the profiles ends obtained engaging the same in retaining flanges included in the supports and hinges of connection of the sections.

Therefore, the main purpose of this invention is to provide an articulated boom arm applicable to an agricultural spraying machine or similar which comprises a plurality of consecutive beam sections extending from a first support which holds said boom arm cantilevered outwards of said machine by means of a first beam section, wherein each beam section shows a profile of section beam hollow and constant in length, which main structural novelty comprises the incorporation of at least one connectable hinge to two of said consecutive beam sections wherein said hinge has two hinged support pieces and articulated pivoting one each other and wherein each hinged support piece includes at least one engaging and disengaging connection means connectable type to at least one of the ends of said sections of consecutive beams, therefore obtaining a fast engage and disengage of the metal extruded profiles or compound materials avoiding the fix welding.

Other additional objectives of the manner of example of this invention will be evident in the section corresponding to the detailed description of the invention and the claims annexed.

BRIEF DESCRIPTION OF THE FIGURES

For more clarity and understanding of the purpose of this invention, the same has been illustrated in several figures, wherein the invention has been presented in a preferable embodiment, solely for illustrative example, wherein:

FIG. 1 is a perspective view of an articulated nozzle-holder boom arm applicable to agricultural spraying machines according to a first preferable embodiment of this this invention, wherein the special hinge of this invention including means of reversible connection through engagement is open in such a manner that two sections of consecutive beam are rebutted between them therefor shortening the total length of the articulated boom arm and giving room to what is called transportation position or folded position.

FIG. 2 is a perspective view of the articulated boom arm illustrated in FIG. 1, once the hinge of this invention is closed, in such a manner as to obtain the complete extension of all the sections of the beam. Said FIG. 2 includes an expanded detail referred to as DETAIL—A—which highlights a section of interest for the purposes of this invention, which is the novel structure of hinge connection of this invention which includes engaging and disengaging connection means.

DETAILED DESCRIPTION OF THE INVENTION

As it was mentioned previously regarding the prior art, the agricultural sprayers are intended to provide a broad width of spraying of phytosanitary product over large extensions of land. For this purpose, the sprayers have both nozzle-holder boom arms which extend in cantilevered the most possible as far as possible to both sides of the chassis or central boom which supports and transports them.

This invention is addressed to a novel articulated boom arm for agricultural spraying. In the figures annexed it is clearly identified this articulated boom arm (10) which will be described in detail below, and therefore, for the purposes of this invention it can be mentioned indistinctly as "articulated boom arm", "nozzle-holder boom arm", nozzle-holder bar", "sprayer boom arm", "boom", since all said wording make clear reference to the set of pieces intended to be connected to the main frame or chassis and which enables to distribute towards at least one of the sides (one side of each boom arm) a plurality of nozzles, which are finally the elements through which the spray shall be applied over the crop.

As the purpose of this invention is intended for the provision of a novel nozzle-holder articulated boom arm (10), the same is illustrated in a general manner in a folded or "for transportation" position (see FIG. 1) and in an extended or "working" position (See FIG. 2) to observe the complete functionality of the same in a preferred embodiment of this invention. As those skilled in the technical field would observe, the rest of the sprayer has not been illustrated, since the articulated boom arm (10) can be mounted without major inconveniences in said type of sprayer machinery and/or similar, and therefore it can be applied to another type of machinery if necessary.

As it can be observed in FIGS. 1 and 2, the articulated boom arm (10) suitable to be applied to an agricultural spraying machine, comprises a plurality of consecutive beam (T) sections, which for the purposes of the example in FIG. 2 are individually identified as (T1, T2, T3, etc.). Said nozzle-holder articulated boom arm extends from a first support (11) which holds said boom arm (10) cantilevered towards one of the sides and outwards in relation to a central chassis (not shown) through a first section of beam (T1).

Figure 7:
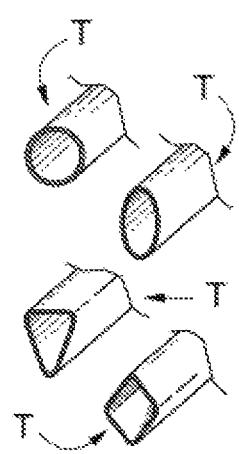
FIG. 7 shows several shapes of the sections that can be adopted by the beam sections in compatible manner with this invention, with the only purpose to offer clear examples of the applications of this invention to a broad range of designs, but this does not constitute any limitation to the shapes of the sections of the profiles and/or the bars used in the assembly of the boom arm according to this invention.

Each beam section (T1, T2, T3) presents a section beam profile which is hollow and constant in all its length, like for example the tubular sections illustrated in FIG. 7. Although several shapes of beam profiles are illustrated, other beam profiles can be used, whether tubular or not, being the aluminum extruded tubular profiles the preferable ones, since they offer a high resistance and low weight.

Figure 3:
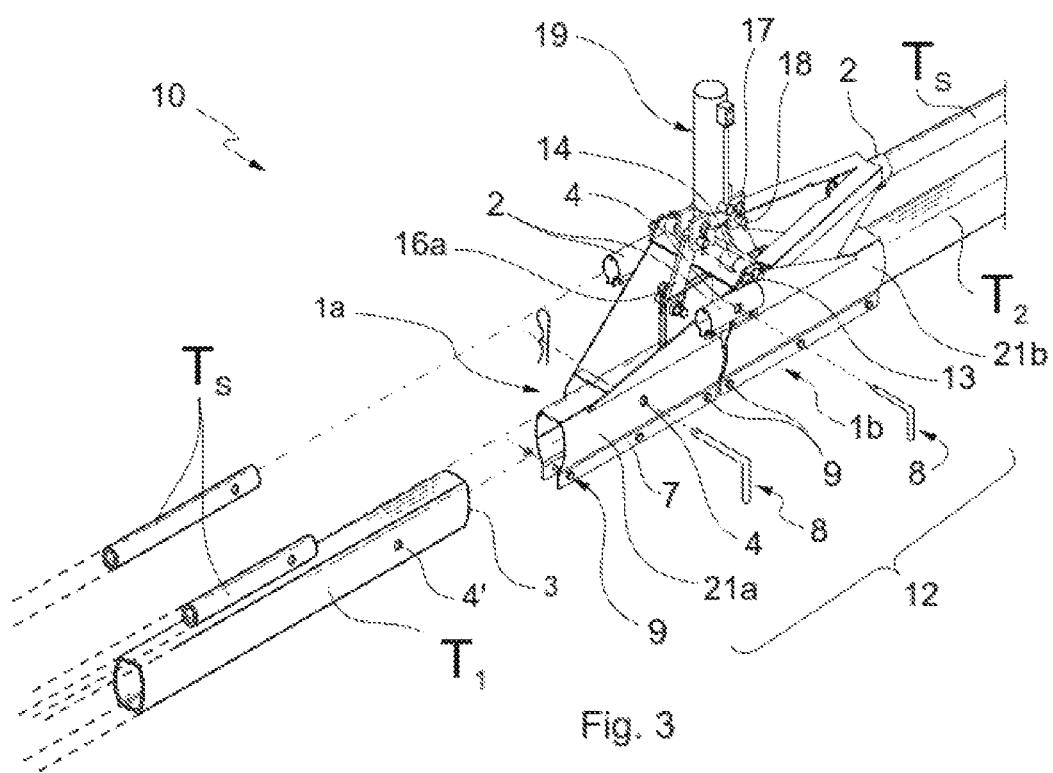
FIG. 3 is a perspective view which shows a portion of the articulated boom arm according to the first embodiment of this invention wherein the novel engaging and disengaging connection in the hinge of this invention; some of the beam section have been disconnected to show the direct and easy manner in which the same can be connected and disconnected from the engaging.

Nevertheless, for the purposes of explicitness of this description and the purpose to illustrate at least a preferable embodiment of easy interpretation, said beam profile has been put into practice as a section generally rectangular of the type shown in FIG. 3.

Said articulated boom arm (10) comprises at least one hinge articulation (12) connectable to two of said sections of consecutive beams (T) wherein said hinge (12) presents two support hinged pieces (1a, 1b) which are articulated pivoting one each other and wherein at least one piece of hinged support (1) includes at least one means of engaging and disengaging connection means (21) which lets it bind in a removable manner with at least one of the extremes of said sections of consecutive beams (T).

Particularly, for FIGS. 1 and 2, the preferred embodiment of this invention comprises a first section of beam (T1) connected in a removable manner in one of its ends (left end of the figure) with a first support (11) and in its other end (3) connected in a removable manner to a support hinged piece (1a) being said support hinged piece (1a) articulated as a hinge in relation to another support hinged piece (1b) adjacent, wherein said adjacent support hinged piece (1b) is connected in a removable manner to an end of a second beam section (T2), being at the same time said second section of beam (T2) connected in a removable manner in its other end to a last releaser hinge (15) being said last hinge the one that can include the releasing mechanism mentioned above. Said last releaser hinge (15) in this embodiment example is connected to a third section of beam (T3) which results to be the most extreme (distal) from said nozzle holder boom arm (10) cantilevered.

It is important to emphasize that the main technical advantage provided by this invention are the removable connections obtained since it includes at least a engaging and disengaging connection means (21) in first instance in one of the hinges (12) and also applicable in second instance in additional linkages or hinges and even in the first support (11) with which the articulated boom arm is linked (10) to the chassis or frame (not shown). The special structure and qualities of a hinge manufactured according to the specifications of this invention can be clearly observed in the central hinge (12) which is connectable and removable through engagement with two consecutive sections of beams (T) which for the case of the figures are the first section of beam (T1) and the second section of beam (T2). It will be evident for those skilled in the art that said hinge (12) connectable in a removable manner to both ends of several sections of beams (T) can be adapted and repeated as many times as necessary in the whole length of the nozzle holder boom arm (10) and therefore it is necessary that at least one of said engaging and disengaging connection means (21) is present to starts to enjoy the technical benefits of this invention and as described in detail below.

As best shown in FIG. 3, said hinge (12) comprises a pair of pieces (1a, 1b) joined in an articulated manner by means of a connection shaft (13) forming a hinged articulation or what could be defined for reference as a hinge.

For the purpose of clarity in this invention, said connection pieces of the several sections of beam shall be identified as proximal hinged support piece (1a) and distal hinged support piece (1b) since effectively said pieces (1a, 1b) articulate as a hinge supporting the beam sections from the extremes. Likewise, one of said pieces (1a) is located next to (that is to say "proximal") to the central chassis and the other piece (1b) is located more distant (that is to say "distal") respect to the chassis or frame not shown but hypothetically located to the left in the subsequent Figures.

As it is illustrated in said FIG. 3, the hinge (12) can be implemented in a variety of shapes incorporating several reinforcement ribs which contribute with the formation of both hinged pieces for support (1a, 1b) always intended to permit the hinged join by means of said connection shaft (13). Manufacturing illustrated in said FIG. 3 is clearly interpreted by those skilled in this technical field and therefore it is not necessary to provide more additional explanations further than the clear technical interpretations observable from the figures and since minor constructive details of shape and not of content are not the object of this invention, they can be modified in design without this altering the spirit and scope here pretended. Nevertheless, since said articulation in the manner of a hinge (12) results dynamic, that is to say, it changes from one close position illustrated in FIGS. 2 to 5, and an open position illustrated in FIGS. 1 and 6, it is convenient to point out that the opening and closing of said hinge (12) can be conveniently actuated with a drive means (19), preferably and conveniently hydraulic, as for example an hydraulic cylinder, which by means of two pulling arms or lever arms (16a, 16b) it permits to open and close said hinge (12) remotely from the vehicle cabin wherein the operator of the sprayer machine is.

As it can be observed in said FIG. 3, the various articulations of the pieces which are part of the opening and closing mechanism of the hinge (12) can be put into practice in a convenient manner making use of a plurality of cylindrical rods (18) and locking pins (17) as those illustrated, or in some manner with equivalent pieces.

Said FIG. 3 illustrates a central hinge (12) wherein the first section of beam (T1) (although it could be mentioned any other section of beam for other designs of nozzle-holder boom arm) is disengaged and distant in respect to said hinge (12). More specifically, said first section of tubular beam (T1) is completely disengaged respect an engaging and disengaging connection means (21a) which for the purpose of this invention it results a of proximal engaging and disengaging connection means.

Said proximal engaging and disengaging connection (21a) is comprised in the proximal hinged support piece (1a) more particularly in the lower part of the proximal hinged support (1a), its purpose is to comply with the specification to pressure-fit adjustably with said at least one of the extremes of one of said sections of one of said consecutive beams (T), for example to pressure-fit adjustably the end (3) of said beam section (T1). For the purposes of this invention, said adjusted pressure-fit is obtained when said engaging and disengaging connection means comes to be a lower flange (21) suitable to pressure-fit adjustably with at least one of the ends of one of said sections of one of said consecutive beams (T), this being obtained as follows:

When said lower flange (21a) is a rolled profile which snug fits from outside and adjustably with said beam profile (T1) when one of its extremes (3) is introduced in said lower flange (21a) and presents at least one fastening means (8 and/or 9) that once adjusted prevents the sliding of said lower flange (21*a*) respect to said beam (T1); or When said lower flange (21*a*) is a profile which snug fits from inside and adjustably with said beam profile (T1) when one of its extremes (3) nests in said lower flange (21*a*) which snug-fits from inside and presents at least one fastening means (8 and/or 9) that once adjusted prevents the sliding of said lower flange (21*a*) with respect to said beam (T1);

Wherein, it results evident for those skilled in the art that in case b) the geometry and general design of the lower flange (21*a*) and the beam profile (T1) are put into practice in an appropriate manner without need to illustrate the same to understand their meaning, which results evident for someone knowledgeable in this field of the technique.

In reference to the fastening means (8,9) it is worth noting that it is enough to provide at least one fastening means, like for example one or more screws (9) with their corresponding nuts, of the kind of castle nuts, self-braking and/or equivalent qualities of fastening, which permit a fast and easy tightening by means of a simple tool like a spanner for screw tightening (adjustable spanner, piped key, etc.) once an end part of a beam section (T) has been fitted in the corresponding engaging and disengaging connection means (21).

For the example of design of FIG. 3, when inserting an end part of the first tube (T1) inside the proximal lower flange (21*a*) it is possible then to adjust the screws (9) and strongly hold said first beam section (T1) engaged and fixed in said hinged piece of support (1*a*). Said fastening means (9) preferably comprise screws and nuts, the same can be placed as it is shown in the figures, in the lower part, forcing the closure on two wings or ribbons (7) which appear in the lower part of said lower flange (21*a*), which may result an incomplete profile in the lower part to let said screws (9) actuate in such a manner that they pressure the end of the beam section (T1) strongly by friction.

Likewise, said fastening means (8 and/or 9) have to be enough in quantity and quality so as to obtain the safe holding of the corresponding beam section (T) and therefore they can be implemented with at least one fastening means selected from the group consisting of screws and nuts, studs, threaded bolts, spigots, bolts, fast acting cams also known as pressure quick release and/or combinations of the same, besides some other known ones.

The nozzle-holder articulated boom arm (10) according to this invention and for the particular case of the articulation in the manner of a hinge (12), and as a non limiting example, makes the contact profile of said proximal lower flange (21*a*) to match with the contact profile of the beam section (T1) which snug fits in said profile of said lower flange (21*a*). Likewise, the contact profile of said distal lower flange (21*b*) to match with the contact profile of the beam section (T1) which snug fits in said profile of said distal lower flange (21*b*). Consequently, both removable connections of the beam sections are obtained (T1 and T2) with the corresponding proximal (1*a*) and distal (1*b*) hinged pieces of support, as said proximal (1*a*) and distal (1*b*) hinged pieces of support include at least one engaging and disengaging connection means (21*a* or 21*b*), for this case in particular, in the manner of lower flanges (21*a*, 21*b*) in the case of main hinge (12).

It is worth noting that to the purposes of this invention, the expression "contact profile" when referring to a beam section (T) or said lower flanges (21), it is the internal or external perimeter, surface of contact more or less complex, interior or exterior with which lower flange (21) and beam (T) effectively fits or matched, said expression is used for the purposes of clarity and shall not be understood as restrictive, so therefore whenever these pieces fix or links in an appropriate manner to obtain a removable but stable connection, said definition of "contact profile" shall be subordinated to the fact of obtaining said fixing, linking or engagement necessary to obtain a clear temporary union between beam and articulation.

As regards FIG. 2, wherein said central hinge (12) is closed (extended arm) it can be observed that said nozzle-holder arm (10) not only is suited with a succession of consecutive beam sections (T1, T2, and T3) that remain aligned among them when said hinge (12) remains closed; but they also have some secondary beam sections, identified interchangeably all of them with the reference (Ts), which comply the function of upper tie rods, that is to say, they help to support the load charge suffered by the beam sections (T).

The secondary beam sections (Ts), although these can be replaced by other types of "tie bars" or "lighteners" such as tightening cables, ribs or rigid profiles made of compound materials and similar, for the example of preferable embodiment herein detailed and in order to obtain a nozzle-holder boom arm (10) of homogeneous structure in the whole boom arm, said sections are carried to practice as beams of smaller section respect to the overall beams, and consequently the can be connected freely according to the design chosen whether in the first support (11), the articulations (12), or the last hinge (15) which includes the above mentioned releaser, having the same type of removable connection already described for the main beams (T).

A stronger rigidity of the set can be obtained when adding some ribs (6) normally more than one per section of arm, which keep the distance between the several beams (T, Ts), therefore they reinforce the mechanical assembly and at the same time can be used for the connection and channeling of conduits towards the nozzles, among other uses. Further consideration to this ribs (6) is not necessary since the Figures provide enough clarity for those skilled in the art to understand the nature of its incorporation and the necessary basic technical qualities.

In order to standardize the type of connection between supports, articulations and beams in this particular articulated nozzle-holder boom arm (10), the same has been carried to practice in a preferable embodiment wherein each piece of hinged support (1) includes also an upper engaging and disengaging connection means (2) suitable to snug fit with one of the section ends of secondary beam (Ts) being this upper engaging and disengaging connection means an upper flange (2) located in an upper position in relation to the lower flange (21)

When observing alternatively FIG. 3 and "Detail A" enlarged in FIG. 2, it can be clearly verified how the engaging and disengaging of the various sections of the beam are performed, both the main sections (T) and the secondary sections (Ts) act as upper tie rods, wherein the upper engaging and disengaging connection means (3) are connected removably with the ends of the tightener beams (Ts) in the same manner that the lower flanges (21) do, and therefore fastening and holding the tightener beams (Ts) in the same manner through fastening means. Consequently, they are considered as equivalent removable connection means, and it is not necessary to further description to this respect since the only variation is the position in which said upper engaging and disengaging connection means (3) are included, being its quantity and geometry as general wedging or linkage, as well as the particular fastening means used mere variations of design or manufacturer choice.

As a review and summary of all the above described in relation to FIGS. 1 to 3, an assembly and folding of the nozzle-holder boom arm corresponding to this invention in FIGS. 1 to 6.

Figure 4:
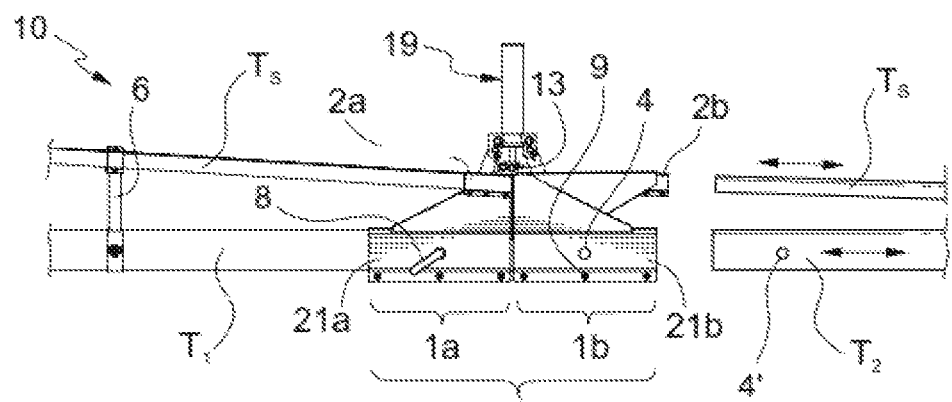
FIG. 4 is a lateral view of section of the nozzle-holder boom arm wherein the novel hinged connection of this invention is located which includes a reversible socket connection (fast engage and disengage without welding) according to FIG. 3, wherein the beam sections to the right of the Figure have not been mounted yet or have been disconnected.

In said FIG. 4, a partial detail of the nozzle-holder boom arm (10) can be observed in a side view, as a reference, the main chassis would be located to the left of the Figure and out of page (that means, not shown). Said hinge (12) is closed, and the lower flanges (21a, 21b) and the upper flanges (2a, 2b) are aligned. Primary sections (T1) and secondary sections (Ts) are fitted in the corresponding flanges and fastened with fastening means (8, 9). From the right side, the most distal consecutive beams (Ts) and the second section of beam (T2) appear, wherein said extremes can be fitted with the lower and upper distal lower and upper flanges (21b, 2b). Particularly, in the example of the preferable embodiment of this invention, the flanges (21b, 2b) embrace the periphery of the profile of the corresponding flange sections in such a manner that said flange extremes are inserted enough so as to stay effectively fitted. It is worth noting that the engagement may include a textured surfaces of contact to increase friction between the pieces and favor its holding in position of the engaged pieces when fastening the fastening means (8, 9, etc.) Particularly, several drillings (4, 4') have been illustrated, which allow the insertion of studs and/or bolts (8) which act as fastening means, likewise, a plurality of nuts and screws (9) are distributed in a convenient manner in the lower wings of the flanges to embrace adjustably the beams when said screws are tightened. It is understood that several other manners to put into practice the means of adjustment can be contemplated, like for example threaded bolts which may pass through from side to side both the flanges and the beams, therefore cramping and pressing the flange in combination, and other similar embodiments.

Figure 5:
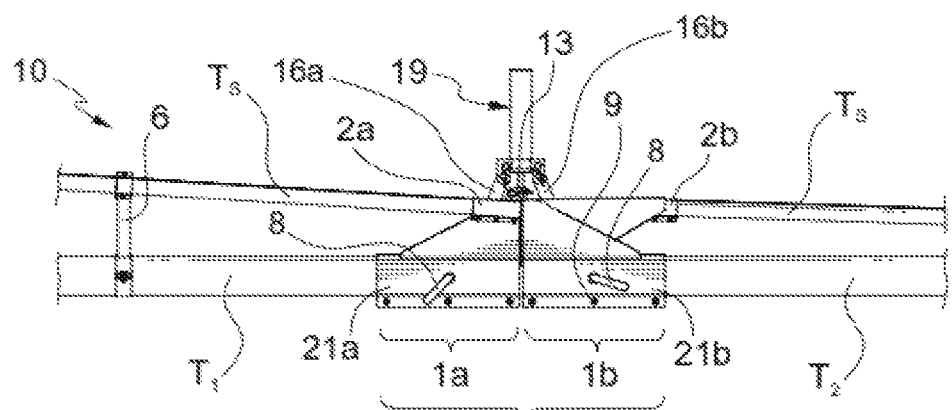
FIG. 5 is a lateral view of section of the nozzle-holder boom arm wherein the novel hinged connection of this invention is located which includes a reversible socket connection (fast engage and disengage without weldings) according to FIG. 3, wherein the beam sections have already been disconnected which were mentioned as disconnected in FIG. 4.

FIG. 5 shows all the beam sections connected in the several engaging and disengaging connection means (21) of both hinged pieces of support (1a, 1b) of the hinge (21), in this case the distal, proximal, upper and lower hinges illustrated as manner of example, all its components have already been described in detail, and consequently no more details are necessary.

Figure 6:
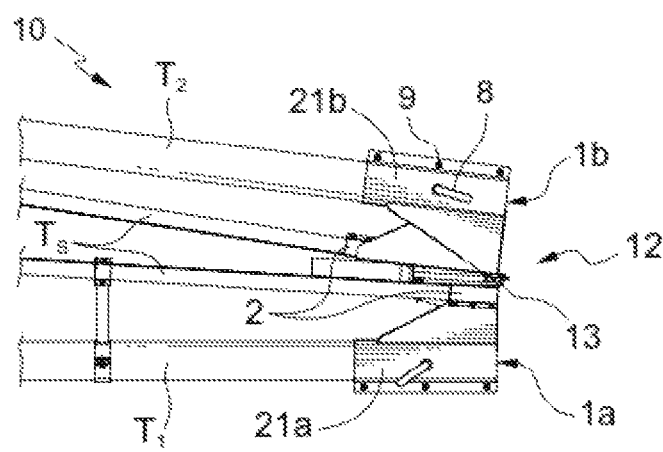
FIG. 6 is a side view according to FIGS. 4 and 5, having opened said hinge to obtain the folding of the articulated boom arm.

It is observed that the hinge (12) presents a pivoting articulation of said two hinged pieces of support (1a, 1b) which make them achieve a folded position on the most distal sections as shown in FIG. 6. Wherein the folding of the distal sections is performed thanks to the hydraulic drive (19) which pivots over said horizontal connection shaft (13) and wherein said means of hydraulic drive (19) is also connected by both pulling arms (16a, 16b) with said hinged pieces of support (1a, 1b) of sections, in such a manner that the driving of said hydraulic drive (19) causes the opening or closing of said hinge (12).

Both hinged pieces of support (1a, 1b) comprise housings (14) (See FIG. 3) of a connection shaft (13) which is horizontal and performed on each hinged piece of support (1a, 1b) and above said lower hinges (21a, 22b) when said hinge is in the open position.

FIG. 7 shows several transversal sections, preferably of metal profiles such as aluminum, preferably manufactured by extrusion which can be used without problems with bean sections (T) in the amounts and lengths desired, likewise in the profile used in the preferred embodiment the cut of the left beam sections can be observed in FIG. 3.

Finally, and as those skilled in the technique can understand, the nozzle-holder arm (10), in order to be erected over the chassis or main frame, comprises a first support (11), said first end support is connectable and/or is firmly connected in some convenient manner with the chassis or main frame (See FIGS. 1 and 2). Said first support (11) can be conveniently articulated in one or more directions, since it permits a pivoting of the same boom arm around a vertical shaft, for example to fold the boom arm onwards or backwards, besides a pivoting similar to the other articulations. Irrespective of the manner in which said first support (11) articulates, the same is connected removably with said first beam section (T1) cantilevered, since it includes at least one engaging and disengaging connection means (21) of the nearest end to the chassis of said first beam section (T1) of the same type described and illustrated for the flange already described in detail. Likewise, being said first support (11) the one which supports the whole nozzle-holder boom arm (10) cantilevered, the same includes in a convenient manner a movement shock absorber means (5) of the kind of a damper and a spring, or similar, or a reception stop (22) of the most distal beam section (T3) to guarantee and reduce the movement of the folded section during the transportation of the equipment.

In the manner it has been described and illustrated in the descriptive report, this invention consists of a novel nozzle-holder articulated boom arm for an agricultural sprayer, which can be implemented, as it has been illustrated as way of example, or otherwise introducing design modifications and variations which shall remain comprised within the scope of protection claimed below when said design modifications or variations are mere equivalent embodiments.

The invention claimed is:

1. An articulated boom arm (10) adapted to be used with an agricultural spraying machine, the articulated boom arm comprising:
    a plurality of consecutive beam sections (T1, T2) each having a profile periphery, and laying out from a first support (11) which holds said boom arm (10) cantilevered outwards of said agricultural spraying machine through a first beam section (T1);
    at least one hinge (12) connectable to two of said consecutive beam sections (T1, T2);
    wherein said at least one hinge (12) having two hinged support pieces (1a, 1b) pivoting one to each other around a horizontal connection shaft (13);
    wherein each hinged support piece (1a, 1b) includes an upper assembly and at least one lower flange (21a and/or 21b) suitable to embrace the profile periphery of at least one end of the corresponding beam section (T1 or T2), the at least one lower flange having two wings (7) in a lower part of the at least one lower flange resulting in an incomplete profile in only the lower part around the corresponding beam section and the at least one lower flange having several drillings (4, 4') which allow the insertion of at least one fastening device (8 and/or 9);
    wherein the at least one fastening device (8 and/or 9) holds the corresponding beam section (T1 or T2) preventing the sliding of said lower flange (21a and/or 21b) with respect to said corresponding beam section (T1 and/or T2; and
    wherein each of the upper assemblies comprises two vertically extending portions spaced from each other on each of the at least one lower flanges attached to the connection shaft.

2. The articulated boom arm according to claim 1, wherein said at least one fastening device is selected from the group consisting of screws and nuts, studs, threaded bolts, spigots, bolts, and fast acting cams.

3. The articulated boom arm according to claim 2, wherein said consecutive beam sections (T1, T2) have several drillings (4, 4') which allow the insertion of the at least one corresponding fastening device.

* * * * *